United States Patent
Patel et al.

(10) Patent No.: US 10,284,425 B2
(45) Date of Patent: May 7, 2019

(54) DEVICE REGISTRATION AWARENESS FOR OVER-THE-AIR UPDATES

(71) Applicant: Cellco Partnership, Basking Ridge, NJ (US)

(72) Inventors: Taral Patel, Piscataway, NJ (US); Miguel A. Carames, Martinez, CA (US); Stephen J. Kolanowski, Keller, TX (US)

(73) Assignee: Cellco Partnership, Basking Ridge, NJ (US)

( * ) Notice: Subject to any disclaimer, the term of this patent is extended or adjusted under 35 U.S.C. 154(b) by 1056 days.

(21) Appl. No.: 14/167,161

(22) Filed: Jan. 29, 2014

(65) Prior Publication Data

US 2015/0215160 A1    Jul. 30, 2015

(51) Int. Cl.
*H04L 12/24*    (2006.01)
*H04L 29/08*    (2006.01)

(52) U.S. Cl.
CPC .......... *H04L 41/082* (2013.01); *H04L 67/02* (2013.01); *H04L 67/306* (2013.01); *H04L 67/34* (2013.01)

(58) Field of Classification Search
CPC ..... H04L 41/082; H04L 67/02; H04L 67/306; H04L 67/34
USPC .......................................................... 709/221
See application file for complete search history.

(56) References Cited

U.S. PATENT DOCUMENTS

| | | | | |
|---|---|---|---|---|
| 7,010,572 B1 * | 3/2006 | Benjamin | ............ | G06Q 10/107 709/203 |
| 7,809,366 B2 * | 10/2010 | Rao | .......................... | G06F 8/65 455/418 |
| 7,889,684 B2 * | 2/2011 | Chai | ........................ | H04L 12/24 370/259 |
| 8,023,485 B2 * | 9/2011 | Shi | ..................... | H04L 29/12188 370/338 |
| 8,311,521 B1 * | 11/2012 | Paczkowski | ............ | H04L 51/14 348/14.06 |
| 8,351,934 B1 * | 1/2013 | Schmitt | ............. | H04M 3/42178 455/419 |
| 8,578,005 B1 * | 11/2013 | Breau | .................... | H04W 4/001 709/202 |
| 8,966,034 B1 * | 2/2015 | Paczkowski | ............ | H04W 8/18 455/435.2 |

(Continued)

FOREIGN PATENT DOCUMENTS

EP        2086167 A1 *   8/2009    ............. H04L 12/24

*Primary Examiner* — Krista M Zele
*Assistant Examiner* — Timothy Sowa

(57) ABSTRACT

A device may determine that a user device is to receive an update. The device may determine that the user device is not registered to a network associated with receiving the update. The device may provide a registration notification request based on determining that the user device is not registered to the network. The registration notification request may include information identifying the user device. The device may receive a response to the registration notification request. The response may indicate that the user device is registered to the network. The device may provide, based on receiving the response, an update message associated with the update. The update message may be destined for the user device and may include information indicating that the user device is to receive the update. The device may provide the update to the user device after providing the update message.

20 Claims, 10 Drawing Sheets

(56) References Cited

U.S. PATENT DOCUMENTS

| | | | | |
|---|---|---|---|---|
| 9,020,487 B2* | 4/2015 | Brisebois | ............ | H04W 8/245 370/328 |
| 2002/0184033 A1* | 12/2002 | Fitzpatrick | ............ | G10L 13/033 704/268 |
| 2003/0035409 A1* | 2/2003 | Wang | ............ | H04L 29/06 370/349 |
| 2005/0060361 A1* | 3/2005 | Chatrath | ............ | H04L 41/0806 709/200 |
| 2006/0087691 A1* | 4/2006 | Matsugashita | ............ | G06F 3/1213 358/1.15 |
| 2006/0149847 A1* | 7/2006 | Meskauskas | ............ | H04L 65/1016 709/229 |
| 2007/0191035 A1* | 8/2007 | Huggett | ............ | H04W 4/14 455/466 |
| 2007/0288621 A1* | 12/2007 | Gundu | ............ | H04W 8/005 709/223 |
| 2008/0126555 A1* | 5/2008 | Rao | ............ | H04W 8/245 709/230 |
| 2008/0127232 A1* | 5/2008 | Langen | ............ | H04L 29/12188 719/328 |
| 2008/0228892 A1* | 9/2008 | Staack | ............ | H04L 65/1006 709/206 |
| 2008/0268847 A1* | 10/2008 | Mukherjee | ............ | H04W 36/005 455/436 |
| 2009/0138564 A1* | 5/2009 | Beddus | ............ | H04L 69/329 709/206 |
| 2009/0271490 A1* | 10/2009 | Seitz | ............ | H04L 51/28 709/206 |
| 2010/0048175 A1* | 2/2010 | Osborn | ............ | H04L 63/08 455/411 |
| 2010/0062767 A1* | 3/2010 | Leis | ............ | H04L 69/40 455/435.1 |
| 2011/0213758 A1* | 9/2011 | Cao | ............ | H04L 67/306 707/691 |
| 2012/0094643 A1* | 4/2012 | Brisebois | ............ | H04W 8/245 455/418 |
| 2012/0302229 A1* | 11/2012 | Ronneke | ............ | H04L 29/12754 455/422.1 |
| 2012/0307844 A1* | 12/2012 | Bollapalli | ............ | H04L 67/16 370/503 |
| 2014/0297520 A1* | 10/2014 | Levchin | ............ | G06Q 20/02 705/39 |
| 2015/0131559 A1* | 5/2015 | Becker Hof | ............ | H04L 4/12 370/329 |
| 2015/0312387 A1* | 10/2015 | Merino Vazquez | ............ | H04L 65/1016 370/216 |
| 2016/0182675 A1* | 6/2016 | Rabbani | ............ | H04L 65/1016 709/223 |
| 2016/0315938 A1* | 10/2016 | Kunz | ............ | H04L 65/1016 |

\* cited by examiner

DEVICE REGISTRATION AWARENESS FOR OVER-THE-AIR UPDATES

BACKGROUND

A device management protocol, such as the Open Mobile Alliance Device Management (OMA-DM) protocol, may be designed to manage a user device (e.g., a smart phone, a tablet computer, etc.). For example, the device management protocol may support provisioning associated with the user device, configuration of the user device, software updates associated with the user device, fault management associated with the user device, or another type of device management function.

DETAILED DESCRIPTION

The following detailed description of example implementations refers to the accompanying drawings. The same reference numbers in different drawings may identify the same or similar elements.

A service provider may wish to provide an update (e.g., a provisioning update, a configuration update, a software update, a fault management update, etc.) to a user device via a network associated with the service provider. One way that the device manager may provide the update to the user device is by sending an update message (e.g., a short message service (SMS) message, a wireless access protocol (WAP) push notification, etc.) to the user device (e.g., via the network) indicating that the user device is to execute a device manager client (e.g., an application, installed on the user device, configured to communicate with the device manager to receive the update). However, the device manager may send the update message without knowing whether the user device is registered to the network (e.g., whether the user device is connected to the network, whether the user device is attached to the network, whether the user device is available to receive the update via the network, etc.). As such, the device manager may be required to repeatedly retry sending the message if the user device is not registered to the network.

Implementations described herein may allow a device manager to determine that a user device is registered to a network without repeatedly providing an update message to the user device. In other words, the device manager may not be required to attempt to provide the update message to the user device without knowing whether the user device is registered to the network.

Figure 1A:
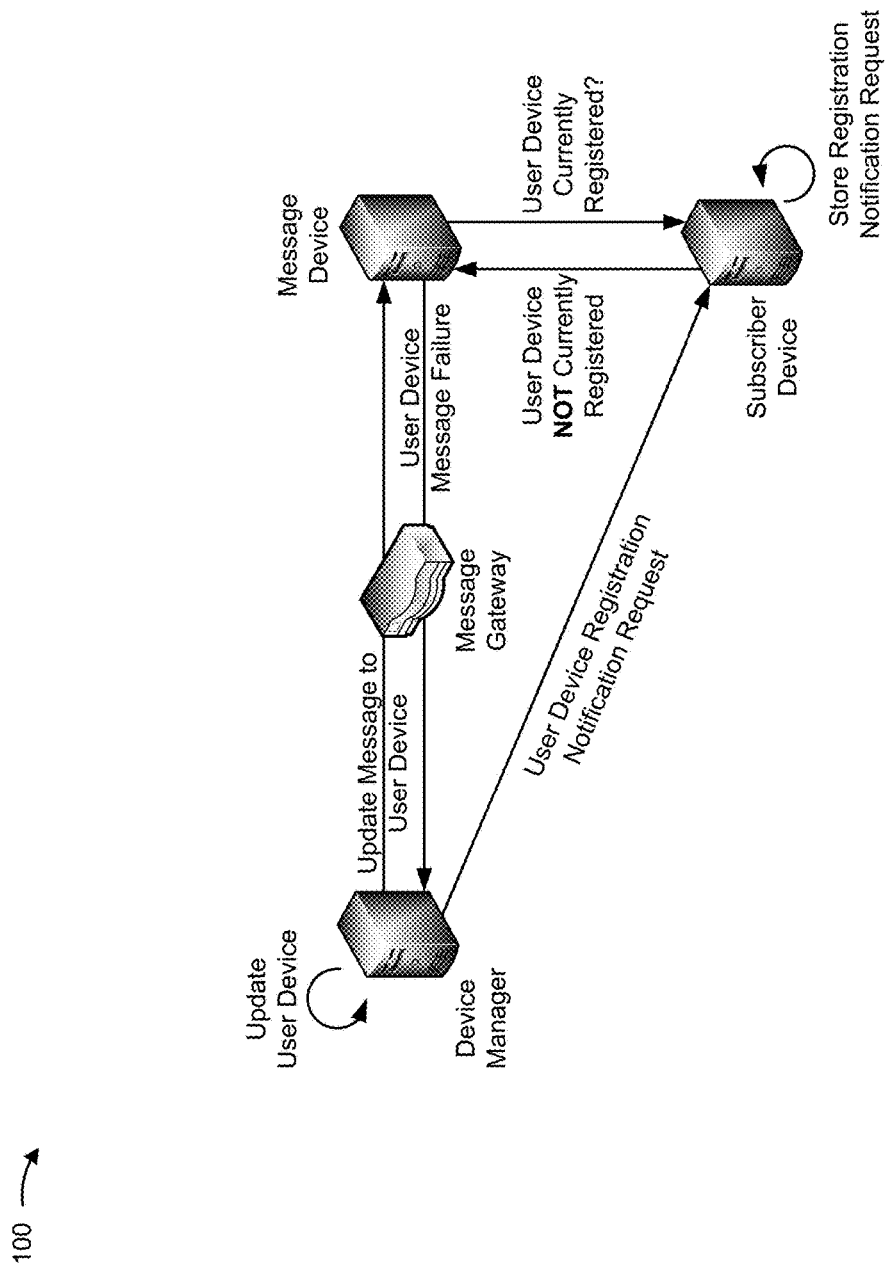
FIGS. 1A and 1B are diagrams of an overview of an example implementation described herein.
Figure 1B:
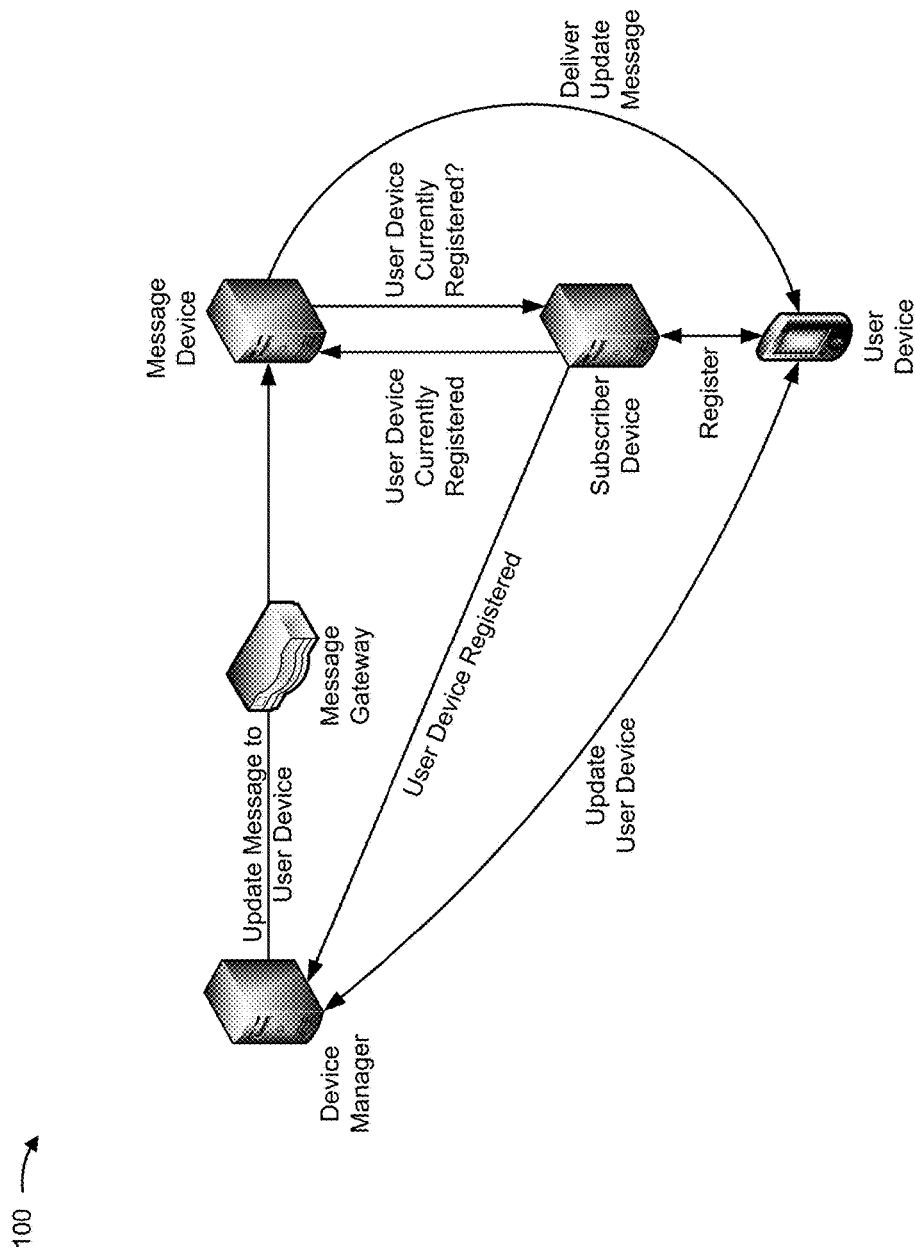

FIGS. 1A and 1B are diagrams of an overview of an example implementation 100 described herein. For the purposes of example implementation 100, assume that a device manager is configured to determine when an update is to be provided to a user device. Further assume that the device manager is to send an update message (e.g., via a network) to the user device when an update is to be provided to the user device, and that the device manager is to provide the update to the user device (e.g., when the device is registered to the network).

As shown in FIG. 1A, the device manager may determine that the user device is to receive an update (e.g., a provisioning update, a configuration update, a software update, a fault management update, etc.) from the device manager. As shown, the device manager may send, to a message gateway, an update message destined for the user device. For the purposes of example implementation 100, assume that the update message includes information indicating the user device is to communicate with the device manager to receive the update.

As further shown, the message gateway may identify a message device that is to provide the update message to the user device, and the message gateway may forward the update message to the message device. As further shown, the message device may receive the update message, and may send, to a subscriber device, a query to determine whether the user device is registered to the network (e.g., whether the user device is connected to the network, whether the user device is attached to the network, whether the user device is available to receive the update via the network, etc.). As shown, the subscriber device may determine that the user device is not registered to the network and that the update message cannot be delivered to the user device, and may provide, to the message device, a response to the query indicating that the user device is not registered to the network.

As further shown, the message device may receive the response to the query, and may provide, to the device manager, a failure notification associated with the update message (e.g., since the message device cannot deliver the update message to the user device). As further shown, the device manager may receive the failure notification, and may provide, to the subscriber device, a registration notification request associated with the user device. For the purposes of example implementation 100, assume that the registration notification request includes information indicating that the subscriber device is to notify the device manager when the user device registers to the network (e.g., when the user device becomes available to receive the update). As shown, the subscriber device may receive and store the registration notification request associated with the user device.

As shown in FIG. 1B, assume that the user device registers to the network (e.g., after the device manager provides the registration notification request to the subscriber device). As shown, the subscriber device may provide, to the device manager, information indicating that the user device is registered to the network (e.g., based on the stored registration notification request). As shown, the device manager may provide a second update message to the message gateway, and the message gateway may provide the second update message to the message device. As further shown, the message device may send, to the subscriber device, another query to determine whether the user device is registered to the network. As shown, the subscriber device may determine that the user device is registered to the network, and may provide, to the message device, a response to the query indicating that the user device is registered to the network. As shown, the message device may receive the response to the query, and may provide the second update message to the user device. As further shown, the user device may receive the second update message, may execute a device manager client installed on the user device (e.g., based on information included in the second update message), and the user device may receive the update (e.g., via the device manager client).

In this way, a device manager may determine that a user device is registered to a network without repeatedly attempting to provide an update message to the user device. In other words, the device manager may not be required to repeatedly attempt to provide the update message to the user device without knowing whether the user device is registered to the network.

Figure 2:
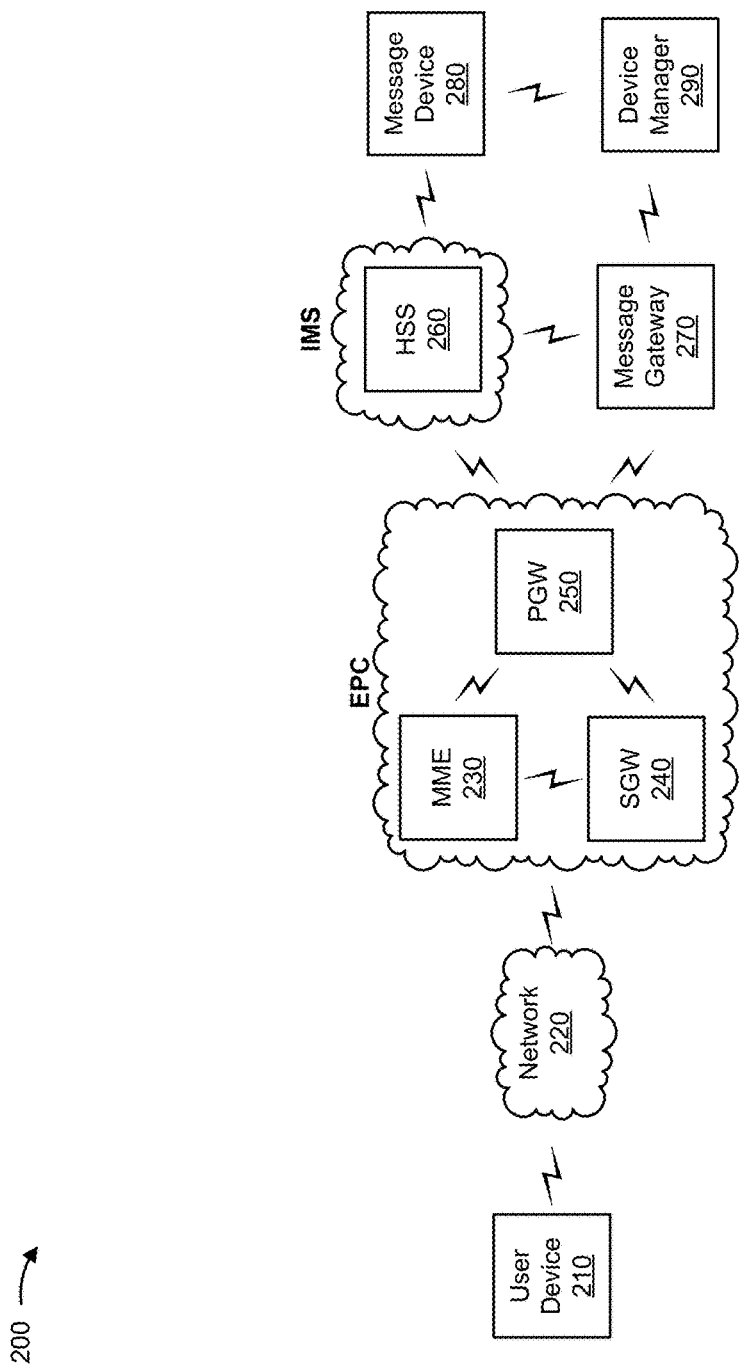
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a network 220, a mobility management entity device (MME) 230, a serving gateway (SGW) 240, a packet data network gateway (PGW) 250, a home subscriber server (HSS) 260, a message gateway 270, a message device 280, and a device manager 290.

Some implementations are described herein as being performed within a long term evolution ("LTE") network for explanatory purposes. Some implementations may be performed within a network that is not an LTE network, such as a third generation ("3G") network.

Environment 200 may include an evolved packet system (EPS) that includes an LTE and/or an evolved packet core (EPC) that operate based on a third generation partnership project (3GPP) wireless communication standard. The LTE network may include network 220 that includes one or more base stations that take the form of evolved Node Bs (eNBs) via which user device 210 communicates with the EPC. The EPC may include MME 230, SGW 240, and PGW 250 that enable user device 210 to communicate with an Internet protocol (IP) multimedia subsystem (IMS) core network. The IMS core network may include HSS 260 and/or one or more other devices associated with managing authentication, session initiation, account information, profile information, etc., associated with user device 210. HSS 260, message gateway 270, message device 280, and/or device manager 290 may reside in the IMS core network and/or the EPC.

User device 210 may include a device capable of communicating with device manager 290 (e.g., to receive an update) via network 220, the IMS core network, and/or one or more other devices. For example, user device 210 may include a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a tablet computer, and/or a similar device. In some implementations, user device 210 may be capable of registering to the IMS core network via network 220 and/or HSS 260 (e.g., such that user device 210 may receive the update from device manager 290). Additionally, or alternatively, user device 210 may be capable of receiving and/or sending information associated with an update provided by device manager 290.

Network 220 may include one or more wired and/or wireless networks. For example, network 220 may include a cellular network, a public land mobile network (PLMN), a second generation (2G) network, a third generation (3G) network, a fourth generation (4G) network, a fifth generation (5G) network, an LTE network, an evolved universal terrestrial radio access network (E-UTRAN), a universal terrestrial radio access network (UTRAN), a GSM radio access network (GRAN), and/or another type of network. Additionally, or alternatively, network 220 may include the IMS core network. Additionally, or alternatively, network 220 may include a local area network (LAN) (e.g., a wireless LAN), a wide area network (WAN), a metropolitan area network (MAN), a telephone network (e.g., the Public Switched Telephone Network (PSTN)), an ad hoc network, an intranet, the Internet, a fiber optic-based network, or a combination of these or other types of networks. In some implementations, network 220 may allow user device 210 to communicate with another device (e.g., device manager 290, HSS 260, etc.), the EPC, and/or the IMS core network.

MME 230 may include a device capable of managing authentication, activation, deactivation, and mobility functions associated with user device 210. For example, MME 230 may include a server. In some implementations, MME 230 may perform operations relating to authentication of user device 210. Additionally, or alternatively, MME 230 may facilitate the selection of a SGW 240 and/or PGW 250 to serve traffic to and/or from user device 210. MME 230 may perform an operation associated with handing off user device 210 from a first base station (e.g., included in a first network 220) to a second base station (e.g., included in the first network 220 or a second network 220) when user device 210 is transitioning from a cell associated with the first base station to a cell associated with the second base station. Additionally, or alternatively, MME 230 may select another MME (not shown), to which user device 210 should be handed off (e.g., when user device 210 moves out of range of MME 230).

SGW 240 may include a device capable of routing information (e.g., data packets) associated with user device 210. For example, SGW 240 may include one or more data processing and/or traffic transfer devices, such as a gateway, a router, a modem, a switch, a firewall, a network interface card ("NIC"), a hub, a bridge, a server, an optical add/drop multiplexer ("OADM"), or any other type of device that processes and/or transfers information. In some implementations, SGW 240 may receive information (e.g., provided by user device 210 via one or more base stations associated with the network 220), and may send the information to other devices associated with the IMS core and/or the EPC (e.g., via PGW 250). SGW 240 may also receive information from the other devices associated with the IMS core and/or the EPC, and may send the received information to user device 210 (e.g., via network 220). Additionally, or alternatively, SGW 240 may perform operations associated with handing off user device 210 to and/or from the LTE network.

PGW 250 may include a device capable of providing connectivity for user device 210 to external packet data networks (e.g., other than the depicted EPC). For example, PGW 250 may include one or more data processing and/or traffic transfer devices, such as a gateway, a router, a modem, a switch, a firewall, a NIC, a hub, a bridge, a server, an OADM, or any other type of device that processes and/or transfers information. In some implementations, PGW 250 may receive information (e.g., provided by user device 210 via SGW 240), and may send the information to other devices associated with the IMS core and/or the EPC. Additionally, or alternatively, PGW 250 may receive information from the other devices associated with the IMS core and/or the EPC, and may send the information to user device 210 via SGW 240.

HSS 260 may include a subscriber device capable of managing subscription and/or other information associated with user device 210. For example, HSS 260 may receive, store, and/or provide profile information associated with user device 210 that identifies applications and/or services that are permitted for use by and/or accessible by user device 210, information associated with a user of user device 210 (e.g., a username, a password, a personal identification number ("PIN"), etc.), subscription information, rate information, minutes allowed, bandwidth allocation policy information, and/or other information. In some implementations, HSS 260 may be capable of receiving (e.g., from device manager 290) a registration notification request, associated with user device 210 and the IMS core network, and providing a response to the registration notification request to device manager 290 (e.g., after user device 210 registers to the IMS core network).

Message gateway 270 may include a device capable of receiving, processing, storing, routing, and/or providing information associated with an update message provided by device manager 290. For example, message gateway 270 may include a short message peer-to-peer (SMPP) gateway, a server, or a collection of servers. Additionally, or alternatively, message gateway 270 may include one or more data processing and/or traffic transfer devices, such as a gateway, a router, a modem, a switch, a firewall, a NIC, a hub, a bridge, a server, an OADM, or any other type of device that processes and/or transfers information. Additionally, or alternatively, message gateway 270 may be a device capable of identifying a message device 280 that is to provide an update message to user device 210. Additionally, or alternatively, message gateway 270 may be capable of communicating with user device 210, message device 280, and/or device manager 290. In some implementations, message device 280 may be capable of receiving an update message from device manager 290, identifying a message device 280 that is to provide the update message to user device 210, and providing the update message to the identified message device 280.

Message device 280 may include one or more devices capable of receiving, generating, processing, storing, and/or providing information associated with an update message (e.g., a short message service (SMS) message) to be delivered to user device 210. For example, message device 280 may include a short message service center (SMSC) device, such as a server or a collection of servers. Additionally, or alternatively, message device 280 may be capable of communicating with user device 210, HSS 260, message gateway 270, and/or device manager 290. In some implementations, message device 280 may be capable of coordinating, managing, and/or handling a delivery of an update message to user device 210.

Device manager 290 may include a device capable of determining that an update is to be provided to user device 210, and providing the update to user device 210. For example, device manager 290 may include a server or a collection of servers that are configured to operate in accordance with a device management protocol (e.g., the OMA-DM protocol) that is designed to manage user device 210. In some implementations, device manager 290 may be capable of receiving, determining, processing, and/or providing information associated with a provisioning update associated with the user device 210, a configuration update associated with user device 210, a software update associated with user device 210, a fault management update associated with user device 210, or another type of update associated with another function and/or operation of user device 210.

Additionally, or alternatively, device manager 290 may be capable of communicating with user device 210, HSS 260, message gateway 270, and/or message device 280. Additionally, or alternatively, device manager 290 may be capable of generating and/or providing an update message associated with user device 210. Additionally, or alternatively, device manager 290 may be capable of generating and/or providing a registration notification request associated with user device 210. Additionally, or alternatively, device manager 290 may be capable of receiving, processing, and/or storing a response to a registration notification request.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
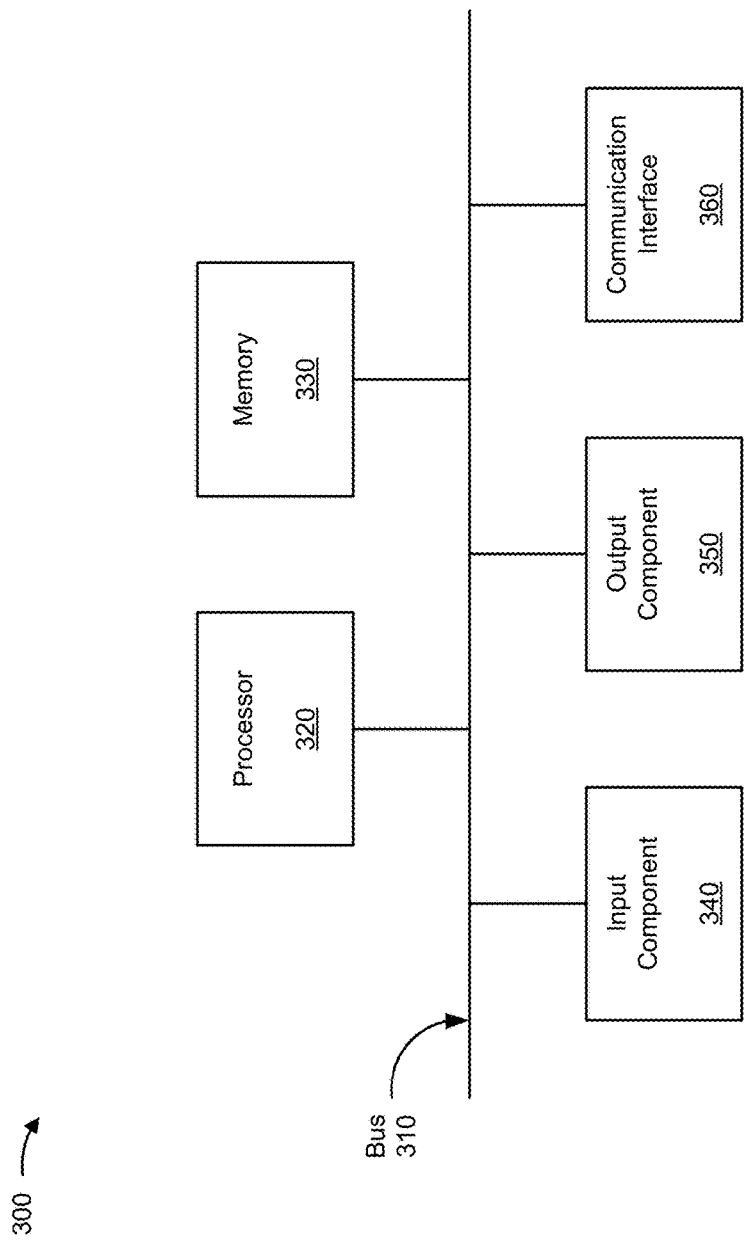
FIG. 3 is a diagram of example components of one or more devices of FIG. 2.

FIG. 3 is a diagram of example components of a device 300. Device 300 may correspond to user device 210, MME 230, SGW 240, PGW 250, HSS 260, message gateway 270, message device 280, and/or device manager 290. Additionally, or alternatively, each of user device 210, MME 230, SGW 240, PGW 250, HSS 260, message gateway 270, message device 280, and/or device manager 290 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
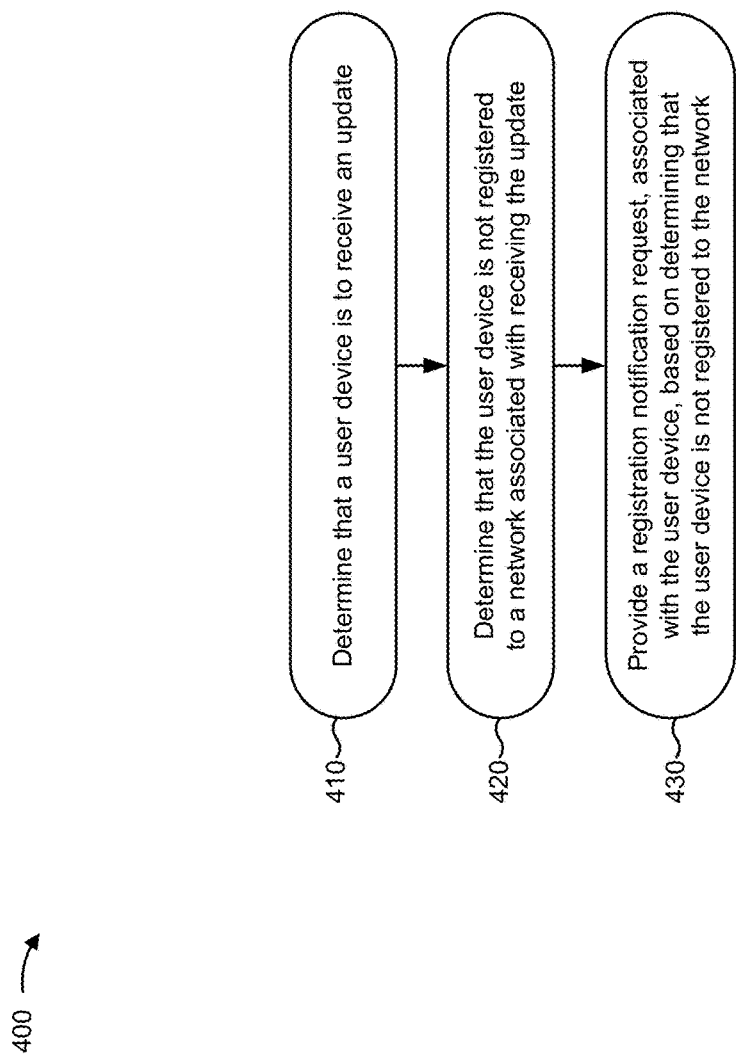
FIG. 4 is a flow chart of an example process for determining that a user device is to receive an update via a network, and providing a registration notification request, associated with the user device, based on determining that the user device is not registered to the network.

FIG. 4 is a flow chart of an example process 400 for determining that a user device is to receive an update via a network, and providing a registration notification request, associated with the user device, based on determining that the user device is not registered to the network. In some implementations, one or more process blocks of FIG. 4 may be performed by device manager 290. In some implementations, one or more process blocks of FIG. 4 may be performed by another device or a group of devices separate from or including device manager 290, such as one or more other devices included in environment 200.

As shown in FIG. 4, process 400 may include determining that a user device is to receive an update (block 410). For example, device manager 290 may determine that user device 210 is to receive an update. In some implementations, device manager 290 may determine that user device 210 is to receive the update when device manager 290 receives the update. For example, device manager 290 may receive (e.g., from a device associated with generating the update) the update, and may automatically determine that user device 210 is to receive the update when device manager 290 receives the update.

Additionally, or alternatively, device manager 290 may determine that user device 210 is to receive the update when device manager 290 receives information indicating that user device 210 is to receive the update. For example, device manager 290 may receive the update, and device manager 290 may receive, from an administrator associated with device manager 290, input indicating that user device 210 is to receive the update from device manager 290.

Additionally, or alternatively, device manager 290 may determine that user device 210 is to receive the update based on a configuration associated with device manager 290. For example, device manager 290 may be configured to provide the update at a particular time of day (e.g., 12:00 a.m., 9:00 a.m., etc.), at a particular period of time (e.g., device manager 290 may be configured to provide updates once every two days, device manager 290 may be configured to provide updates once a week, etc.).

Additionally, or alternatively, device manager 290 may determine that user device 210 is to receive the update based on information stored by device manager 290. For example, device manager 290 may store information indicating that a particular application is installed on user device 210, device manager 290 may receive an update associated with the particular application, and device manager 290 may determine that user device 210 is to receive the update based on the stored information (e.g., since the particular application is installed on user device 210, device manager 290 may determine that user device 210 is to receive the update).

An update may include updated information, to be received by user device 210, associated with an application installed on user device 210, a service provided to user device 210, software installed on user device 210, a setting associated with user device, 210, or another function and/or operation associated with user device 210. For example, the update may include a provisioning update (e.g., an update associated with initiating a service, an update associated with enabling and/or disabling features of a service, etc.), a configuration update (e.g., an update associated with a setting, an update associated with a parameter, an update associated with an access point name, etc.), a software update (e.g., an update associated with software installed on user device 210, an update associated with a software bug fix, a system software update, an application software update, etc.), a fault management update (e.g., an update associated with error reporting, an update associated with a user device 210 status query, etc.), and/or another type of update.

As further shown in FIG. 4, process 400 may include determining that the user device is not registered to a network associated with receiving the update (block 420). For example, device manager 290 may determine that user device 210 is not registered to a network associated with receiving the update. In some implementations, device manager 290 may determine that user device 210 is not registered to the network when device manager 290 determines that user device 210 is to receive the update.

In some implementations, device manager 290 may determine that user device 210 is not registered to the network based on providing an update message associated with the update. For example, device manager 290 may determine that user device 210 is to receive the update, and device manager 290 may generate an update message associated with the update. In some implementations, the update message may be in the form of an SMS message, such as a wireless access protocol (WAP) push notification. The update message may include a user device identifier associated with user device 210 (e.g., an international mobile subscriber identity (IMSI), a mobile subscriber integrated services digital network-number (MSISDN), a mobile directory number (MDN), etc.), information indicating that user device 210 is to receive the update from device manager 290, information indicating that user device 210 is to execute a device manager client (e.g., installed on user device 210 and configured to communicate with device manager 290 to receive the update), and/or other information associated with the update.

In this example, device manager 290 may provide the update message to message gateway 270, and message gateway 270 may provide the update message (e.g., in the form of an SMPP request) to message device 280. Message device 280 may receive the update message, and may determine (e.g., based on a query provided to HSS 260) whether user device 210 is registered to a network (e.g., an IMS core network) associated with receiving the update (e.g., when user device 210 is to receive the update via the IMS core network). If message device 280 determines (e.g., based on the query sent to HSS 260) that user device 210 is not registered the network, then message device 280 may provide, to device manager 290, information indicating that user device 210 is not registered to the network and/or information indicating that message device 280 cannot deliver the update message, and device manager 290 may determine that user device 210 is not registered to the network based on the information provided by message device 280.

In some implementations, device manager 290 may determine that user device 210 is not registered to the network based on a response to a query provided by device manager 290. For example, device manager 290 may determine that user device 210 is to receive the update, and device manager 290 may generate a query associated with determining whether user device 210 is registered to the network. The query may include a user device identifier associated with user device 210 (e.g., an IMSI, an MSISDN, an MDN), information indicating that device manager 290 is to be provided with information indicating whether user device 210 is registered to the network, and/or another type of information. Device manager 290 may provide the query (e.g., via an Sh interface) to HSS 260.

In this example, HSS 260 may receive, from device manager 290, the query and may determine (e.g., based on registration information stored by HSS 260) whether user device 210 is registered to the network (e.g., the IMS core network). If HSS 260 determines that user device 210 is not registered to the network, then HSS 260 may provide, to device manager 290, a response to the query indicating that user device 210 is not registered to the network, and device manager 290 may determine that user device 210 is not registered to the network based on the response provided by HSS 260.

As further shown in FIG. 4, process 400 may include providing a registration notification request, associated with the user device, based on determining that the user device is not registered to the network (block 430). For example, device manager 290 may provide a registration notification request, associated with user device 210, based on determining that user device 210 is not registered to the network. In some implementations, device manager 290 may provide the registration notification request when device manager 290 determines that user device 210 is not registered to the network (e.g., after device manager 290 determines that user device 210 is not registered to the network).

A registration notification request may include a request, provided to HSS 260, indicating that HSS 260 is to inform device manager 290 when user device 210 registers to the network. For example, the registration notification request may be in the form of a diameter protocol message, such as a subscriber notification request (SNR). In some implementations, the registration notification request may be provided, by device manager 290, to HSS 260 via an Sh interface. Additionally, or alternatively, the subscriber notification request may indicate that HSS 260 is to inform device manager 290 when user device 210 registers to the IMS core network. Additionally, or alternatively, the registration notification request may include a user device identifier associated with user device 210 (e.g., an IMSI, an MSISDN, an MDN), information indicating an expiration time associated with the registration notification request (e.g., four hours after receipt, two weeks after receipt, etc.), and/or another type of information.

In some implementations, HSS 260 may receive the registration notification request, and may store the registration notification request (e.g., such that HSS 260 may retrieve the registration notification request and generate a response when user device 210 registers to the network).

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5:
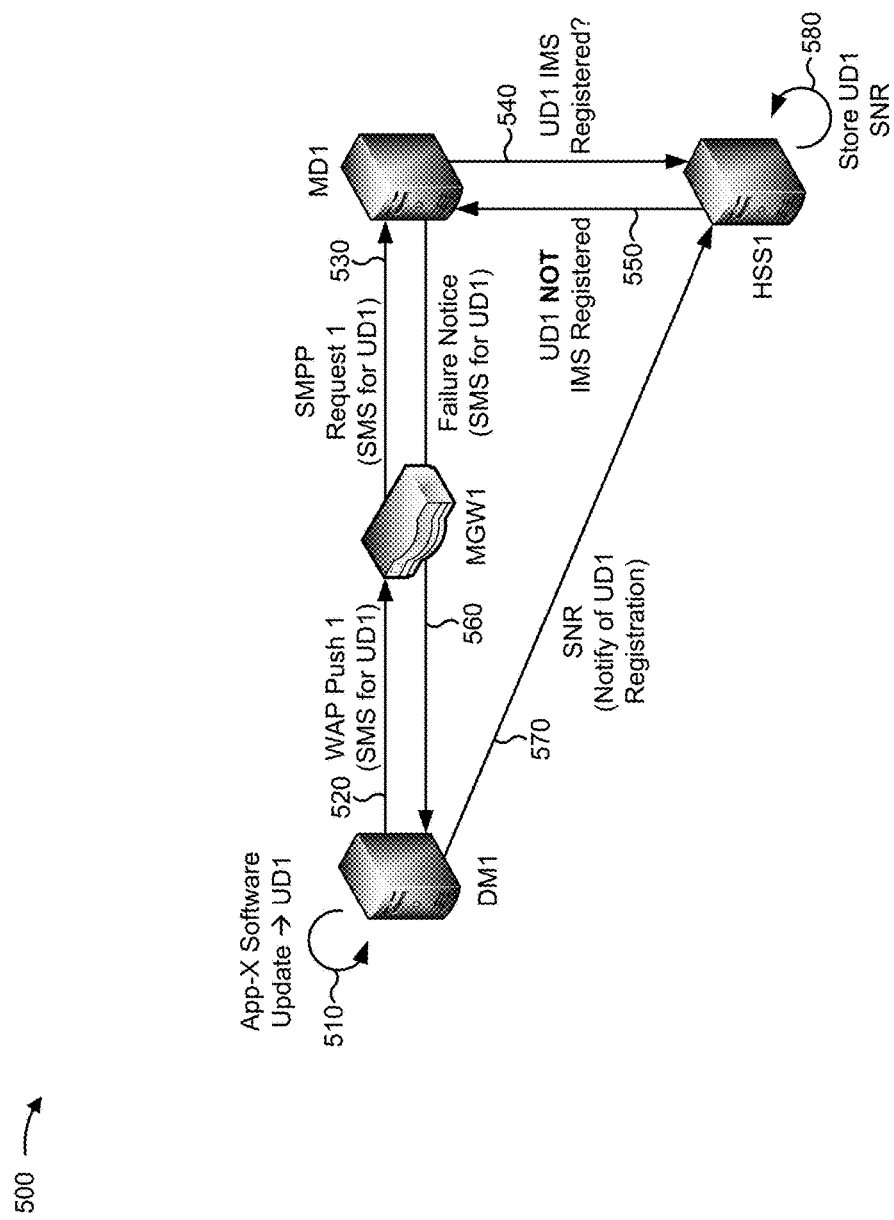
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that a device manager, DM1, has received a software update associated with an application (e.g., App-X). Further, assume that DM1 stores information indicating that App-X is installed on UD1. Finally, assume that DM1 is configured such that UD1 is to receive an update from DM1 automatically (e.g., without administrator intervention) after DM1 receives the update.

As shown in FIG. 5, and by reference number 510, DM1 may determine that UD1 is to receive the App-X update (e.g., based on the information indicating that App-X is installed on UD1 and the configuration indicating that UD1 is to receive an update from DM1 automatically). As shown, DM1 may generate an update message, WAP push 1, that includes information identifying UD1 and information indicating that UD1 is to receive an update from DM1. As shown by reference number 520, DM1 may provide WAP push 1 to a message gateway, MGW1. As shown by reference number 530, MGW1 may forward the update message, in the form of an SMPP request (e.g., SMPP request 1), to a message device, MD1, associated with delivering the update message to UD1.

As shown by reference number 540, MD1 may receive the update message (e.g., SMPP request 1), and may provide, to a subscriber device (e.g., HSS1), a query associated with determining whether UD1 is registered to an IMS core network (e.g., assume that UD1 is to receive the update via the IMS core network). As shown by reference number 550, HSS1 may determine that UD1 is not registered to the IMS core network, and may provide, to MD1, a response indicating that UD1 is not registered to the IMS network. As shown by reference number 560, MD1 may receive the response to the query, and may provide, to DM1 (e.g., via MGW1), information (e.g., an SMS failure notification) indicating that that the update message cannot be delivered (e.g., since UD1 is not registered to the IMS network). As shown by reference number 570, DM1 may receive the SMS failure notification from MD1, may generate a registration notification request, in the form of an SNR, indicating that DM1 is to be informed when UD1 registers to the IMS core network, and may provide (e.g., via the Sh interface) the SNR to HSS1. As shown by reference number 580, HSS1 may receive and store the SNR provided by DM1.

As indicated above, FIG. 5 is provided merely as an example. Other examples are possible and may differ from what was described with regard to FIG. 5.

Figure 6:
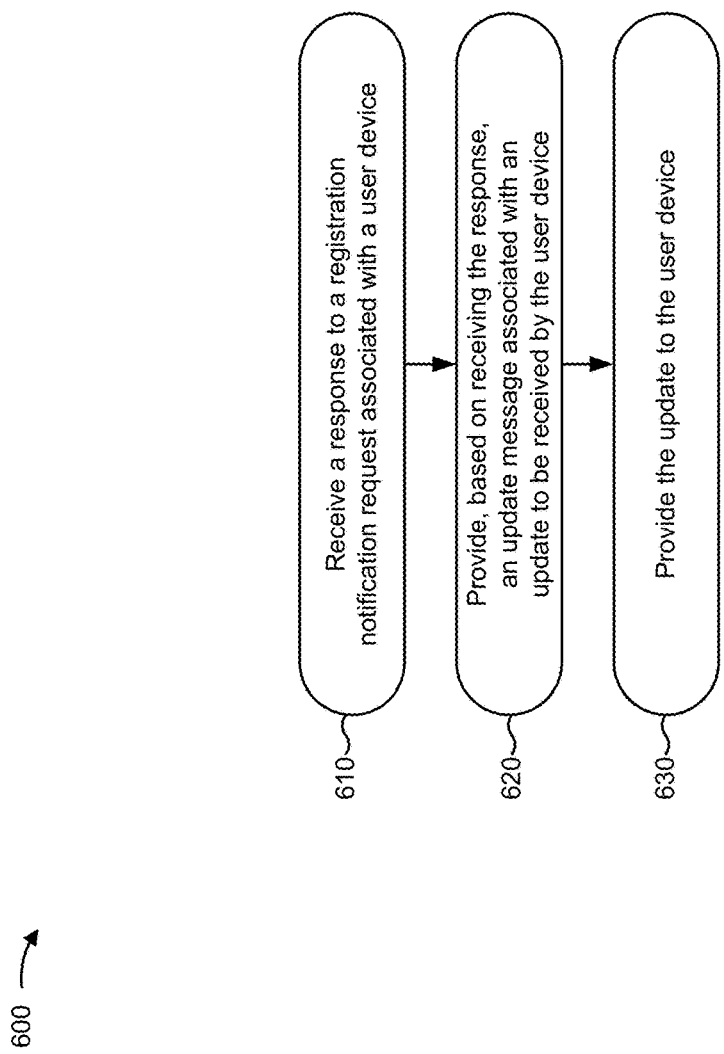
FIG. 6 is a flow chart of an example process for receiving a response to a registration notification request, associated with a user device, and providing the update to the user device.

FIG. 6 is a flow chart of an example process 600 for receiving a response to a registration notification request, associated with a user device, and providing an update to the user device. In some implementations, one or more process blocks of FIG. 6 may be performed by device manager 290. In some implementations, one or more process blocks of FIG. 6 may be performed by another device or a group of devices separate from or including device manager 290, such as one or more other devices included in environment 200.

As shown in FIG. 6, process 600 may include receiving a response to a registration notification request associated with a user device (block 610). For example, device manager 290 may receive a response to a registration notification request associated with user device 210. In some implementations, device manager 290 may receive the response when the response is provided by HSS 260 (e.g., via the Sh interface). Additionally, or alternatively, device manager 290 may receive the response when the response is provided by another device (e.g., another device included in environment 200).

A response to a registration notification request may include information indicating that user device 210 is registered to a network (e.g., a network associated with receiving an update from device manager 290) and/or that device manager 290 is to provide an update message to user device 210. For example, the response may be in the form of a diameter protocol message, such as a push notification request (PNR). In some implementations, the response may be provided, by HSS 260, to device manager 290 via an Sh interface. Additionally, or alternatively, the response may indicate that device manager 290 is to provide an update message associated with an update to be received by user device 210 (e.g., since user device 210 is registered to the network). Additionally, or alternatively, the response may include a user device identifier associated with user device 210 (e.g., an IMSI, an MSISDN, an MDN, etc.), and/or another type of information.

In some implementations, device manager 290 may receive the response, and may determine an update that is to be received by user device 210. For example, device manager 290 may receive the response, and may determine (e.g., based on a user device 210 identifier included in the response) an update (e.g., stored by device manager 290) that is to be received by user device 210 (e.g., when device manager 290 stores information indicating that user device 210 is to receive the update).

As further shown in FIG. 6, process 600 may include providing, based on receiving the response, an update message associated with an update to be received by the user device (block 620). For example, device manager 290 may provide, based on receiving the response from HSS 260, an update message associated with an update to be received by user device 210. In some implementations, device manager 290 may provide the update message when device manager 290 receives the response to the registration notification request (e.g., after device manager 290 receives the response). Additionally, or alternatively, device manager 290 may provide the update message when device manager 290 receives information, indicating that device manager 290 is to provide the update message, from another device (e.g., another device included in environment 200) and/or based on other information (e.g., input from an administrator) provided to device manager 290.

In some implementations, the update message may be in the form of an SMS message, such as a WAP push notification, as discussed above. The update message may include a user device identifier associated with user device 210 (e.g., an IMSI, an MSISDN, an MDN, etc.), information indicating that user device 210 is to receive the update from device manager 290, information indicating that user device 210 is to execute a device manager client, and/or other information associated with the update, as discussed above.

In some implementations, device manager 290 may provide the update message (e.g., in the form of a WAP push notification) to message gateway 270, and message gateway 270 may forward the message (e.g., in the form of an SMPP request) to message device 280. Message device 280 may determine (e.g., based on querying HSS 260) that user device 210 is registered to the network associated with receiving the update, and message device 280 may deliver the update message to user device 210.

As further shown in FIG. 6, process 600 may include providing the update to the user device (block 630). For example, device manager 290 may provide the update to user device 210. In some implementations, device manager 290 may provide the update when device manager 290 receives information indicating that user device 210 may receive the update, as discussed below. Additionally, or alternatively, device manager 290 may provide the update when device manager 290 determines the update (e.g., when device manager 290 retrieves the update from a memory location associated with device manager 290).

In some implementations, device manager 290 may provide the update to user device 210 based on information received from user device 210. For example, user device 210 may receive the update message (e.g., from message device 280), may execute a device manager client (e.g., based on information included in the update message), and the device manager client may send, to device manager 290, information indicating that user device 210 is available and/or ready to receive the update (e.g., via the device manager client). In this example, device manager 290 may receive, from user device 210, the information indicating that user device 210 is available and/or ready to receive the update, and device manager 290 may provide the update to user device 210 based on receiving the information indicating user device 210 is available and/or ready to receive the update.

In some implementations, user device 210 may receive the update from device manager 290, and user device 210 may be updated accordingly (e.g., user device 210 may install a software update included in the update, user device 210 may modify a configuration based on information included in the update, etc.). Additionally, or alternatively, device manager 290 may provide multiple updates to user device 210 (e.g., when device manager 290 stores information indicating that user device 210 is to receive multiple updates). Additionally, or alternatively, device manager 290 may provide the update to user device 210, and device manager 290 may delete information (e.g., stored in a memory location of device manager 290) indicating that user device 210 is to receive the update (e.g., since device manager 290 has provided the update to user device 210).

Although FIG. 6 shows example blocks of process 600, in some implementations, process 600 may include additional blocks, different blocks, fewer blocks, or differently arranged blocks than those depicted in FIG. 6. Additionally, or alternatively, one or more of the blocks of process 600 may be performed in parallel.

Figure 7:
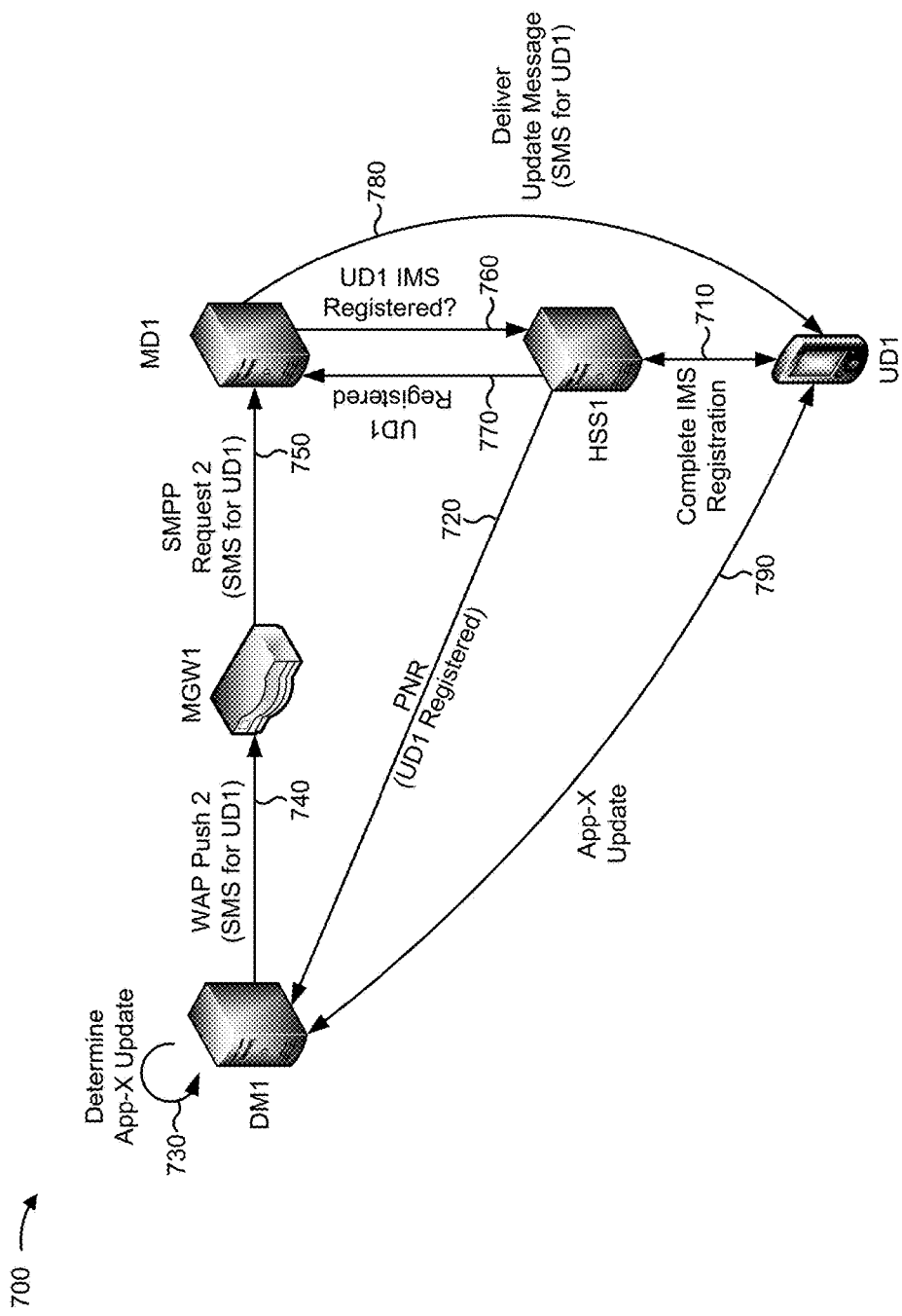
FIG. 7 is a diagram of an example implementation relating to the example process shown in FIG. 6.

FIG. 7 is a diagram of an example implementation 700 relating to example process 600 shown in FIG. 6. For the purposes of example implementation 700, assume that a device manager, DM1, stores information indicating that a user device, UD1, is to receive an update associated with an application, App-X. Further, assume that DM1 has provided, to a subscriber device (e.g., HSS1) an SNR indicating that HSS1 is to notify DM1 when UD1 registers to an IMS core network (e.g., assume that the App-X update is to be received by UD1 via the IMS core network).

As shown in FIG. 7, and by reference number 710, UD1 may register to the IMS core network (e.g., when UD1 powers on, when a user of UD1 indicates that UD1 is to connect to the IMS core network, etc.). As shown by reference number 720, HSS1 may provide (e.g., via an Sh interface), to DM1, a response to the SNR (e.g., in the form of a PNR), indicating that UD1 has registered to the IMS core network. As shown by reference number 730, DM1 may determine (e.g., based on information stored by DM1) that UD1 is to receive the App-X update after DM1 receives the PNR provided by HSS1. As shown by reference number 740, DM1 may generate an update message, WAP push 2, that includes information identifying UD1 and information indicating that UD1 is to receive an update from DM1, and may provide WAP push 2 to a message gateway, MGW1. As shown by reference number 750, MGW1 may forward the update message, in the form of an SMPP request (e.g., SMPP request 2), to a message device, MD1, associated with delivering the update message to UD1.

As further shown in FIG. 7, and by reference number 760, MD1 may receive the update message (e.g., SMPP request 2), and may provide, to a subscriber device (e.g., HSS1), a query associated with determining whether UD1 is registered to the IMS core network. As shown by reference number 770, HSS1 may determine that UD1 is registered to the IMS core network, and may provide, to MD1 a response indicating that UD1 is registered to the IMS core network. As shown by reference number 780, MD1 may receive the response to the query, and may provide the update message to UD1. As shown by reference number 790, UD1 may receive the update message, and may communicate with DM1 based on information included in the update message (e.g., when the update message indicates that UD1 is to execute a device manager client installed on UD1). As shown, DM1 may provide the App-X update to UD1 when UD1 communicates with DM1 (e.g., via the device manager client), and UD1 may receive and install the App-X update.

As indicated above, FIG. 7 is provided merely as an example. Other examples are possible and may differ from what was described with regard to FIG. 7.

Figure 8:
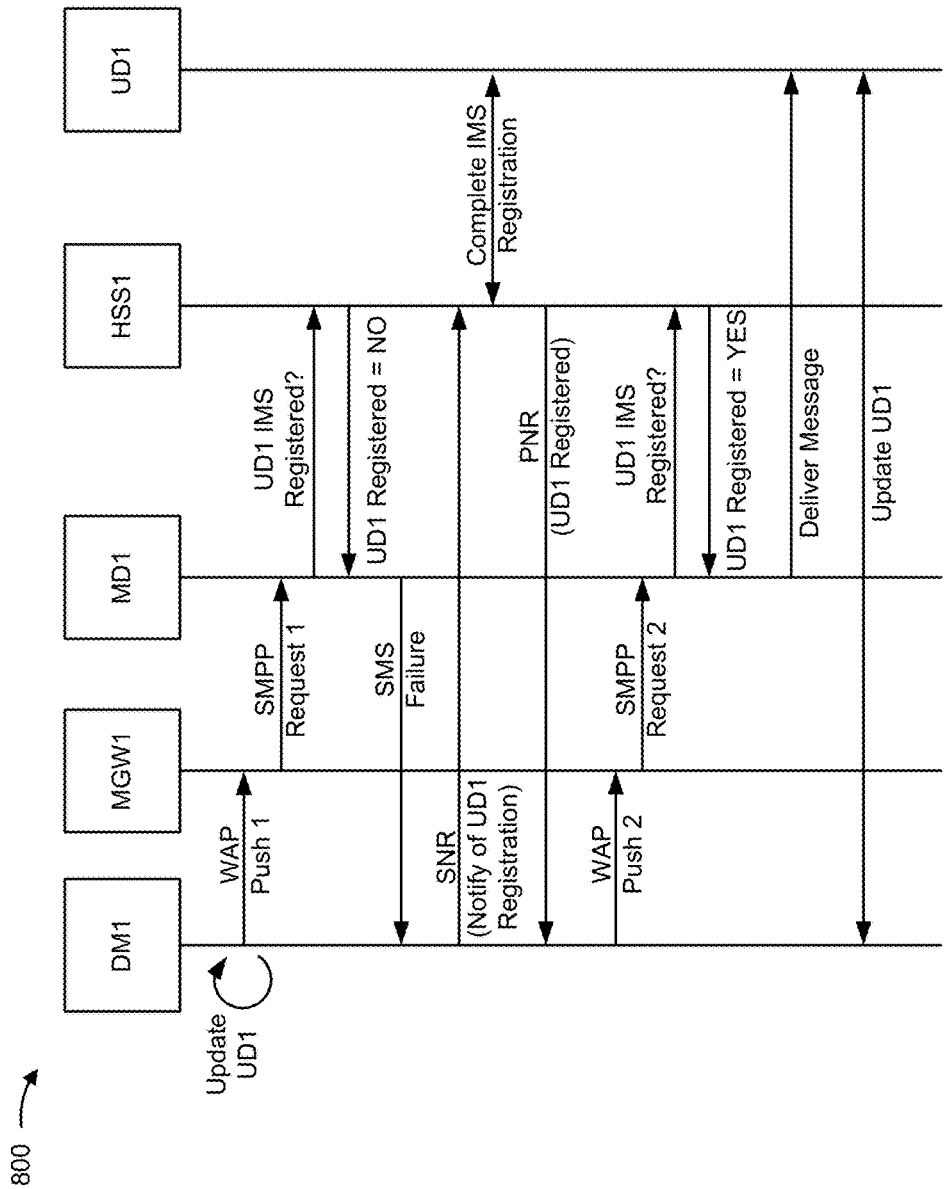
FIG. 8 is diagram of an example call flow relating to the example processes shown in FIG. 4 and FIG. 6.

FIG. 8 is a diagram of an example call flow 800 relating to example processes 400 and 600 shown in FIG. 4 and FIG. 6, respectively. Example call flow 800 shows a first manner in which the example processes, described herein, may be implemented, as detailed above.

As shown in FIG. 8, a device manager, DM1, may determine that a user device, UD1, is to receive an update. As shown, DM1 may generate and provide an update message (e.g., WAP push 1) to a messaging gateway, MGW1. As shown, MGW1 may forward the update message, in the form of an SMPP request (e.g., SMPP request 1) to a message device, MD1, that is to deliver the update message to UD1.

As further shown, MD1 may receive the update message, and may query a subscriber server, HSS1, to determine whether UD1 is registered to an IMS core network associated with receiving the update. As shown, HSS1 may determine (e.g., based on registration information stored by HSS1) that UD1 is not registered to the IMS core network, and may provide, to MD1, information indicating that UD1 is not registered to the IMS core network. As further shown, MD1 may receive the information indicating that UD1 is not registered to the IMS core network, and may send, to DM1, information (e.g., an SMS failure notification) indicating that MD1 cannot deliver the update message to UD1.

As further shown in FIG. 8, DM1 may receive the SMS failure notification, and may send a registration notification request associated with UD1, in the form of an SNR to HSS1. As shown, HSS1 may receive and store the SNR. As further shown, UD1 may register to the IMS core network (e.g., at a later time) via HSS1. As shown, HSS1 may send, to DM1, a response to the registration notification request, in the form of a PNR, after UD1 completes IMS core network registration. As shown, DM1 may receive the PNR provided by HSS1, and may generate and prepare a second update message, WAP push 2. As shown, DM1 may provide WAP push 2 to MGW1, and MGW1 may forward the second update message, in the form of an SMPP request (e.g., SMPP request 2), to MD1.

As further shown, MD1 may receive SMPP request 2, and may query HSS1 to determine whether UD1 is registered to the IMS core network. As shown, HSS1 may determine that UD1 is registered to the IMS core network, and may provide, to MD1, information indicating that UD1 is registered to the IMS core network. As further shown, MD1 may receive the information indicating that UD1 is registered to the IMS core network, and may deliver the second update message to UD1. As further shown, UD1 may receive the second update message, UD1 may communicate with DM1 based on information included in the second update message, and UD1 may receive the update from DM1.

As indicated above, FIG. 8 is provided merely as an example. Other examples are possible and may differ from what was described with regard to FIG. 8.

Figure 9:
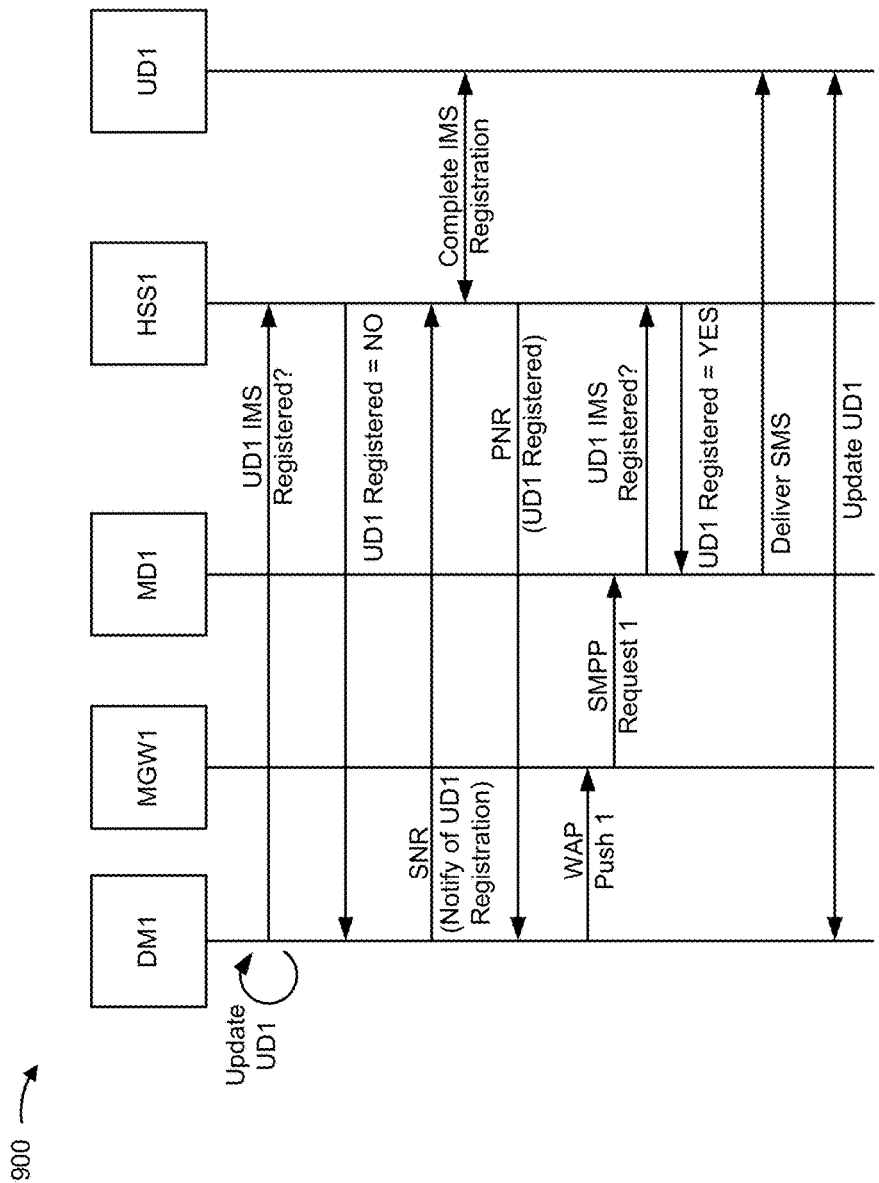
FIG. 9 is a diagram of another example call flow relating to the example processes shown in FIG. 4 and FIG. 6.

FIG. 9 is a diagram of an example call flow 900 relating to example processes 400 and 600 shown in FIG. 4 and FIG. 6, respectively. Example call flow 900 shows a second manner in which the example processes, described herein, may be implemented, as detailed above.

As shown in FIG. 9, a device manager, DM1, may determine that a user device, UD1, is to receive an update. As shown, DM1 may query a subscriber server, HSS1, to determine whether UD1 is registered to an IMS core network associated with receiving the update. As shown, HSS1 may determine (e.g., based on registration information stored by HSS1) that UD1 is not registered to the IMS core network, and may provide, to DM1, information indicating that UD1 is not registered to the IMS core network. As further shown, DM1 may receive the information indicating that UD1 is not registered to the IMS core network, may generate a registration notification request, associated with UD1, in the form of an SNR, and may provide the registration notification request to HSS1. As shown, HSS1 may receive and store the SNR.

As shown, UD1 may register to the IMS core network (e.g., at a later time) via HSS1. As shown, HSS1 may send, to DM1, a response to the registration notification request, in the form of a PNR, after UD1 completes IMS core network registration. As shown, DM1 may receive the PNR provided by HSS 1, and may generate and prepare an update message, WAP push 1. As shown, DM1 may provide WAP push 1 to a message gateway, MGW1, and MGW1 may forward the update message, in the form of an SMPP request (e.g., SMPP request 1), to MD1.

As further shown, MD1 may receive SMPP request 1, and may query HSS1 to determine whether UD1 is registered to the IMS core network. As shown, HSS1 may determine that UD1 is registered to the IMS core network, and may provide, to MD1, information indicating that UD1 is registered to the IMS core network. As further shown, MD1 may receive the information indicating that UD1 is registered to the IMS core network, and may deliver the update message to UD1. As further shown, UD1 may receive the update message, UD1 may communicate with DM1 based on information included in the update message, and UD1 may receive the update from DM1.

As indicated above, FIG. 9 is provided merely as an example. Other examples are possible and may differ from what was described with regard to FIG. 9.

Implementations described herein may allow a device manager to determine that a user device is registered to a network (e.g., that the user device is connected to the network, that the user device is available to receive an update, etc.) without repeatedly attempting to provide an update message to the user device. In other words, the device manager may not be required to attempt to provide the update message to the user device without knowing whether the user device is registered to the network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A manager device, comprising:
   one or more memories; and
   one or more processors, communicatively coupled to the one or more memories, to:
   determine that a user device is to receive an update,
      the update including one of:
         a provisioning update,
         a configuration update,
         a software update, or
         a fault management update;
   determine that the user device is not registered to a network, associated with receiving the update, based on a response generated by a subscriber device,
      the response, generated by the subscriber device, being generated based on a first update message sent by the manager device to the user device,
         the first update message including information indicating that the user device is to receive the update;
   provide, to the subscriber device, a registration notification request based on determining that the user device is not registered to the network,
      the registration notification request being generated as a subscriber notification request (SNR),
      the SNR being provided via an Sh interface,
      the registration notification request being provided before the manager device sends additional update messages to the user device,
      the registration notification request including information identifying the user device, and
      the registration notification request including information indicating that the subscriber device is to notify the manager device when the user device is registered to the network,
         the subscriber device receiving and storing the registration notification request associated with the user device,
         the subscriber device communicating with the user device to determine whether the user device is registered with the network, and
         the user device notifying the subscriber device that the user device is registered to the network;
   receive, from the subscriber device, a response to the registration notification request,
      the response to the registration notification request indicating that the user device is registered to the network;
   provide, based on receiving the response to the registration notification request, a second update message,
      the second update message being a wireless access protocol (WAP) push notification,
      the second update message being destined for the user device, and
      the second update message including information indicating that the user device is to receive the update; and
   communicate with the user device to provide the update to the user device after providing the second update message.

2. The manager device of claim 1, where the one or more processors are further to:

send the first update message to the user device;
receive information indicating that the first update message cannot be delivered to the user device; and
where the one or more processors, when determining that the user device is not registered to the network, are to:
determine that the user device is not registered to the network based on the information indicating that the first update message cannot be delivered to the user device.

3. The manager device of claim 1, where the one or more processors are further to:
provide, to the subscriber device, a query associated with determining whether the user device is registered to the network,
the query including information identifying the user device;
receive the response generated by the subscriber device based on the query,
the response indicating that the user device is not registered to the network; and
where the one or more processors, when determining that the user device is not registered to the network, are to:
determine that the user device is not registered to the network based on the response generated by the subscriber device.

4. The manager device of claim 1, where the one or more processors are further to:
receive information provided by a message device,
the information indicating that the user device is not registered to the network; and
where the one or more processors, when determining that the user device is not registered to the network, are to:
determine that the user device is not registered to the network based on the information provided by the message device.

5. The manager device of claim 1, where the one or more processors are further to:
receive the response to the registration notification request as a push notification request (PNR),
the response to the registration notification request being received via the Sh interface.

6. The manager device of claim 1,
where the one or more processors, when providing the second update message, are further to:
provide the WAP push notification.

7. The manager device of claim 1, where the response generated by the subscriber device is a failure notification.

8. The manager device of claim 1, where the one or more processors are further to:
determine that the user device is to receive the update at a particular time of day or a particular period of time.

9. A method, comprising:
determining, by a manager device, that a user device is to receive an update,
the update including one of:
a provisioning update,
a configuration update,
a software update, or
a fault management update;
providing, by the manager device and to a subscriber device, a query associated with determining whether the user device is registered to a network via which the user device is to receive the update;
receiving, by the manager device and from the subscriber device, a response to the query,
the response to the query indicating that the user device is not registered to the network;
generating, by the manager device, a registration notification request based on receiving the response indicating that the user device is not registered to the network,
the registration notification request including information identifying the user device;
providing, by the manager device and to the subscriber device, the registration notification request based on generating the registration notification request,
the registration notification request being generated as a subscriber notification request (SNR),
the SNR being provided via an Sh interface,
the registration notification request being provided before the manager device sends update messages to the user device, and
the registration notification request including information indicating that the subscriber device is to notify the manager device when the user device is registered to the network,
the subscriber device receiving and storing the registration notification request associated with the user device,
the subscriber device communicating with the user device to determine whether the user device is registered with the network, and
the user device notifying the subscriber device that the user device is registered to the network;
receiving, by the manager device and from the subscriber device, a response to the registration notification request,
the response to the registration notification request indicating that the user device is registered to the network;
providing, by the manager device and based on receiving the response to the registration notification request, an update message to the user device,
the update message being a wireless access protocol (WAP) push notification,
the update message including information indicating that the user device is to receive the update; and
providing, by the manager device, the update to the user device after providing the update message.

10. The method of claim 9, further comprising:
providing the query to the subscriber device via the Sh interface.

11. The method of claim 9, further comprising:
receiving the response to the query, from the subscriber device, via the Sh interface.

12. The method of claim 9 further comprising:
receiving the response to the registration notification request as a push notification request (PNR),
the response to the registration notification request being received via the Sh interface.

13. The method of claim 9, where the response generated by the subscriber device is a failure notification.

14. A non-transitory computer-readable medium storing instructions, the instructions comprising:
one or more instructions that, when executed by one or more processors of a manager device, cause the one or more processors to:
determine that a user device is to receive an update,
the update including one of:
a provisioning update,
a configuration update,
a software update, or
a fault management update;

determine that the user device is not registered to a network, associated with receiving the update, based on a response generated by a subscriber device,
the response, generated by the subscriber device, being generated based on a first update message sent by the manager device to the user device,
the first update message including information indicating that the user device is to receive the update;
provide, to the subscriber device, a registration notification request based on determining that the user device is not registered to the network,
the registration notification request being generated as a subscriber notification request (SNR),
the SNR being provided via an Sh interface,
the registration notification request being provided before the manager device sends additional update messages to the user device,
the registration notification request including information identifying the user device, and
the registration notification request including information indicating that the subscriber device is to notify the manager device when the user device is registered to the network,
the subscriber device receiving and storing the registration notification request associated with the user device,
the subscriber device communicating with the user device to determine whether the user device is registered with the network, and
the user device notifying the subscriber device that the user device is registered to the network;
receive, from the subscriber device, a response to the registration notification request,
the response to the registration notification request indicating that the user device is registered to the network;
provide, based on receiving the response to the registration notification request, a second update message,
the second update message being a wireless access protocol (WAP) push notification,
the second update message being destined for the user device, and
the second update message including information indicating that the user device is to receive the update; and
communicate with the user device to provide the update to the user device after providing the second update message.

15. The non-transitory computer-readable medium of claim 14, where the instructions further comprise:
one or more instructions that, when executed by the one or more processors, cause the one or more processors to:
send the first update message to the user device;
receive information indicating that the first update message cannot be delivered to the user device; and
determine that the user device is not registered to the network based on the information indicating that the first update message cannot be delivered to the user device.

16. The non-transitory computer-readable medium of claim 14, where the instructions further comprise:
one or more instructions that, when executed by the one or more processors, cause the one or more processors to:
provide, to the subscriber device, a query associated with determining whether the user device is registered to the network,
the query including information identifying the user device;
receive the response generated by the subscriber device based on the query,
the response indicating that the user device is not registered to the network; and
determine that the user device is not registered to the network based on the response generated by the subscriber device.

17. The non-transitory computer-readable medium of claim 14, where the instructions further comprise:
one or more instructions that, when executed by the one or more processors, cause the one or more processors to:
receive information provided by a message device,
the information indicating that the user device is not registered to the network; and
determine that the user device is not registered to the network based on the information provided by the message device.

18. The non-transitory computer-readable medium of claim 14, where the instructions further comprise:
one or more instructions that, when executed by the one or more processors, cause the one or more processors to:
receive the response to the registration notification request as a push notification request (PNR),
the response to the registration notification request being received via the Sh interface.

19. The non-transitory computer-readable medium of claim 14, where the instructions further comprise:
one or more instructions that, when executed by the one or more processors, cause the one or more processors to:
generate, after receiving the response to the registration notification request, the second update message as the WAP push notification; and
provide the WAP push notification.

20. The non-transitory computer-readable medium of claim 14, where the response generated by the subscriber device is a failure notification.

* * * * *